Patented Sept. 13, 1938

2,130,238

UNITED STATES PATENT OFFICE 2,130,238

CELLULOSE DERIVATIVE COATING COMPOSITION

Chad H. Humphries, Chicago, Ill., assignor to Sealkote Corporation, Chicago, Ill., a corporation of Delaware No Drawing. Application December 7, 1935, Serial No. 53,433

2 Claims. (Cl. 134—79)

This invention relates to certain new and useful improvements in protective coating solutions and the process of making same. These solutions are of the cellulose acetate-synthetic resin compositions and are used to coat cellulosic material such as various grades of paper, cardboards, and the like, with protective films formed by the evaporation of volatile solvents from such solutions, which films are protective against moisture, water, oils and greases.

It is well known in the art of lacquer making to prepare solutions composed of cellulose acetate, various synthetic resins, plasticizers, together with proper solvents, which combinations result in commercial clear lacquers suitable for covering surfaces such as of metal, wood, and the like. Such combinations are usually made under special formulas suited for particular uses. Lacquers used for paper coatings, primarily decorative, and secondarily protective, are usually made from cellulose nitrates, combined with synthetic resins, and not from cellulose acetate and synthetic resins; the reason for this being the greater ease of compounding with cellulose nitrate, although the various superior qualities of the cellulose acetate-synthetic resin combinations are well known. The chief difficulty lies in the fact that cellulose acetate-synthetic resin lacquers give resultant protective films which are short lived, having a tendency to become brittle in shorter time than films obtained from cellulose nitrate-synthetic resin lacquers. This has been attributed to the employment of improper plasticizers and much research has been done to discover plasticizers which function as satisfactorily as does camphor in celluloid or triphenyl phosphate or tricresyl phosphate in the nitrocellulose type lacquers. Naturally, consideration has been given to the properties, both chemical and physical, of the synthetic resins contained in the earlier made cellulose acetate-synthetic type resin lacquers but heretofore no completely satisfactory combination has been effected.

I have discovered that when certain glycerine-phthalic anhydride resins or modifications of same (which will be referred to hereafter as resins of the glycerine-phthalic acid type) are prepared in a suitable manner, their properties are such as to make them chemically and physically compatible with cellulose acetate in solution, so that the resultant coating or film does not become brittle at an early date, but is flexible and resistant to various media, and in short gives proper protection to the cellulosic material such as paper when deposited thereon as a film from such a suitable solution. In any case the synthetic resins of the glycerine-phthalic acid type with such modification of formation steps as tend to allow them in solution to liberate a small quantity of free glycerine or glycol, and whose acid numbers are between 50 and 100, function in a cellulose acetate solution in the manner above described, and do form resultant films which are not brittle during their early life, but are and remain flexible and resistant to the various media to which they are exposed. These acid numbers are in terms of milligrams of KOH per gram of resin. I do not limit myself to cellulose acetates which are prepared in the ordinary manner using acetic anhydride in the presence of a catalyst, but can use any acetic ester of cellulose. In connection with this choice of synthetic resin of definite physical and chemical properties, there is used a selection of plasticizers which have been found to function best and which, of course, are completely compatible with the prime constituents of the film during the life of the film.

It should be understood that I am referring principally to clear lacquers without pigments, although the lacquers in accordance with my invention may be colored through the use of proper soluble dyes.

In compounding the lacquers or coating solutions of this invention, I necessarily follow the art to a great extent and include therein properly chosen solvents both of high and low boiling point, together with suitable diluents.

I do not need, however, contrary to the general practice of lacquer making, to employ materials known as anti-blushes or clarifiers in my solution, except where water is absorbed from some unforeseen source after the lacquer has been compounded, as a result, for example of the hygroscopicity of some solvent used. A proper selection of plasticizers and mixed solvents and solvent diluents make this unnecessary in view of the complete compatibility of the cellulose acetates and the synthetic resin used.

It should be here stated that the lacquer solution is the means to an end, the resultant film and final protective coating formed by the fast or slow evaporation of the volatile solvents and diluents being the end point. Hence the stability of the final resultant film is as important as the compatibility and homogeneity of the lacquer solution. In the final formation of the film a condition must be present whereby not only is there a lack of segregation of the finally constituent solid materials into lamellar or crystalline areas, but on the contrary a condition of solid solution of the cellulose acetate and the synthetic resin, one in the other, in the presence of the residual fluid or semi-fluid plasticizer. I obtain such conditions by my solutions, which are quick drying solutions; and by this I mean that when deposited in a liquid form upon a paper surface and heated to temperatures between 125° F. and 165° F. they will give a dry surface in approximately thirty seconds. The resultant film can vary between one quarter of one thousandth of an inch and three thousandths of an inch, and will function as a protective medium against water, oils and greases. Also I am able with my solutions to build up such a film in a succession of coating steps until the requisite film thickness is obtained wherever this is necessary or advisable. I do not limit myself to this repeated application of the coating material, but can use, if desired, a single coating of solution to give a film of requisite thickness. I have noticed, however, that where protection is required against water, oil and greases, under extreme service conditions, I can obtain better results when using two or more coatings than where a single coat is employed. This may be due to the complete coating of fibre ends with repeated application, such fibre ends being incompletely sealed by a single coating step.

Before setting forth representative formulae for my coating solutions, I wish to state that I am not limited to any particular cellulose acetate, for example, of a fixed viscosity range or acetyl content; but on the contrary in compounding cellulose acetates with the synthetic resins and the other necessary or desirable constituents, I may vary the grade of cellulose acetate I use so as to modify both the final viscosity in the coating solution and its percentage content of solid materials. This is desirable because of the varying means of application of coating solutions used in different paper coating machinery. In some cases it is preferable to spray the coating on the traveling paper, in which case a thin solution is used; in other cases better results are achieved by applying the coating through the medium of a transfer roll and for this operation a solution of medium thickness is required; and in still other cases direct application of the coating solutions from a single roller surface with the smoothing of the film by a doctor blade is required, in which case a thick viscous compound is used. These different conditions required to obtain a smooth, homogeneous, non-striated film make necessary a difference in the viscosity of the coating solution which is brought about by varying the proportions as between the cellulose acetate and the resin.

The cellulose acetates I use vary between 2 to 5 seconds to 80 to 120 seconds viscosity (A. S. T. M. Standard), and their acetyl content between 36 to 42.

The synthetic resins I use have a softening point or melting point of 60° C. to 95° C. and acid numbers preferably between 50 and 90, such as is disclosed in Patent Number 2,101,948 granted to Felix Lauter December 14, 1937, and assigned to the Sealkote Corporation.

The total percentage of solids, in which is also included the plasticizers, may vary in quite a wide range running between 12% and 40%, by weight of the coating solution.

The percentage of the solvents may vary in weight between 60% and 88% of the coating solution. The solvents and diluents used in compounding this solution may be made of mixtures of such materials as acetone, methyl alcohol, ethyl alcohol, ethyl acetate, ethylene dichloride and toluol, and the proportions of same may be modified depending upon time required for drying and the limits required for compatible solution of the solid constituents.

The plasticizers, preferably dimethyl phthalate and diethyl phthalate and blown, acetylated or chlorinated castor oil, vary in weight between 10% and 30% of the weight of the total solids themselves inclusive.

In the compounding of these coating solutions, it is my practice to dissolve separately the cellulose acetates and the synthetic resins in their fractional parts of the solvents used, clarify the same if necessary by filtration, and mix these solutions together by stirring, in enclosed vessels, afterwards adding the plasticizers.

The following three formulae are indicative of the compositions I employ:

| All parts by weight | Formula 1 | Formula 2 | Formula 3 |
|---|---|---|---|
| Cellulose acetate | 5.0 | 10.0 | 15.0 |
| Synthetic resin of the glycerine phthalic acid type | 15.0 | 10.0 | 5.0 |
| Dimethyl phthalate | 2.0 | 1.0 | 1.5 |
| Diethyl phthalate |  | 1.0 |  |
| Blown acetylated chlorinated castor oil | 1.0 | 1.0 | 1.5 |
| Acetone | 40.0 | 58.4 | 20.0 |
| Methanol | 5.0 | 14.6 | 20.0 |
| Ethylene dichloride |  |  | 33.0 |
| Ethyl acetate | 28.0 |  |  |

By the term "resin of the glycerine phthalic acid type" I mean a synthetic resin resulting from the reaction of phthalic acid or anhydride and glycerine which when dissolved will liberate a small quantity of glycerine or glycol.

The term "plasticizing substance" is intended to include a group of two or more plasticizers.

The term "solvent" is to be understood as including a mixture of solvents and solvent diluents.

I do not limit myself to these particular solvents or plasticizers, but the above are preferred working formulae and according to my specifications.

I claim:

1. A reaction product of from 5 to 15 parts by weight of a glycerine-phthalic acid synthetic resin having a softening point of from 60° C. to 95° C., an acid number between 50 and 90 and sufficient parts by weight of cellulose acetate, to bring the combined parts by weight of the resin and the cellulose acetate to twenty, about 3 parts by weight of plasticizers and about 73 parts by weight of solvents.

2. A reaction product of from 5 to 15 parts by weight of a glycerine-phthalic acid synthetic resin having a softening point of from 60° C. to 95° C., an acid number between 50 and 90 and sufficient parts by weight of cellulose acetate to bring the combined parts by weight of the resin and the cellulose acetate to twenty, about 3 parts by weight of plasticizers comprising a phthalate selected from the group consisting of dimethyl and diethyl phthalate and a castor oil selected from the group consisting of blown, acetylated and chlorinated castor oil, and about 73 parts by weight of solvents comprising acetone and methanol.

CHAD H. HUMPHRIES.